United States Patent [19]

Hare, Sr.

[11] Patent Number: 5,014,829
[45] Date of Patent: May 14, 1991

[54] ELECTRO-RHEOLOGICAL SHOCK ABSORBER

[76] Inventor: Nicholas S. Hare, Sr., 252 Pineville Rd., Monroeville, Ala. 36460

[21] Appl. No.: 577,060

[22] Filed: Aug. 31, 1990

Related U.S. Application Data

[63] Continuation of Ser. No. 376,748, Jul. 3, 1989, abandoned, which is a continuation of Ser. No. 339,748, Apr. 18, 1989, abandoned.

[51] Int. Cl.$^5$ ............................ F16F 9/30; F16F 9/34
[52] U.S. Cl. .................................. 188/267; 123/90.11; 188/322.15; 280/707
[58] Field of Search .......................... 123/90.11, 90.48; 188/267, 299, 314, 322.14, 322 B; 267/218; 280/707

[56] References Cited

U.S. PATENT DOCUMENTS

| | | | |
|---|---|---|---|
| 2,778,259 | 1/1957 | Moir | 188/314 X |
| 3,277,874 | 8/1965 | Wagner | |
| 3,304,925 | 6/1966 | Rhoads | |
| 3,490,423 | 1/1970 | Shunta et al. | |
| 3,742,921 | 7/1973 | Rendine | 123/90.16 |
| 3,809,033 | 5/1974 | Cartledge | 123/90.46 |
| 3,817,228 | 6/1974 | Bywater | 123/90.12 |
| 3,964,455 | 6/1976 | Brown | 123/90.43 |
| 4,133,332 | 1/1979 | Benson et al. | |
| 4,161,306 | 7/1979 | Brune et al. | 251/129 |
| 4,258,671 | 3/1981 | Takizawa et al. | 123/90.16 |
| 4,393,832 | 7/1983 | Samuel et al. | 123/327 |
| 4,452,187 | 6/1984 | Kosuda et al. | 123/90.16 |
| 4,485,780 | 12/1984 | Price et al. | 123/321 |
| 4,700,678 | 10/1987 | Elliott | 123/297 |
| 4,744,914 | 5/1988 | Filisho et al. | 252/74 |
| 4,772,407 | 9/1988 | Carlson | 252/74 |
| 4,858,733 | 8/1989 | Noguchi et al. | 188/267 |

FOREIGN PATENT DOCUMENTS

| | | | |
|---|---|---|---|
| 3631107 | 3/1988 | Fed. Rep. of Germany | 188/267 |
| 0221034 | 12/1983 | Japan | 188/267 |
| 0968534 | 11/1982 | U.S.S.R. | 188/267 |
| 756107 | 8/1956 | United Kingdom | 188/267 |
| 1282568 | 7/1972 | United Kingdom | 188/267 |

OTHER PUBLICATIONS

Electro-Rheological Fluid Devices Near Commerical Stage, Scott and Yamaguchi, Automotive Engineering, Nov. 1985.
Electro-Rheological Fluids & Devices, Automotive Engineering, Dec. 1988.
"Inventors: Got a Use for Liquid that Turns Solid?" Williams, Automotive Industries, vol. 167, p. 28, Jan. 1987.

Primary Examiner—Duane A. Reger
Attorney, Agent, or Firm—Ferrill and Logan

[57] ABSTRACT

An electro-rheological shock absorber. The invention comprises a generally cylindrical inner casing holding an electro-rheological fluid; a reciprocating arm means attached at one end of the cylindrical casing; a dampening plunger member coupled to said arm and extending into said electro-rheological fluid, said dampening plunger being perforated to permit the flow of electro-rheological fluid therethrough; and electrode means coupled to said perforated member for generating an electric field within said perforated member such that said electro-rheological fluid within said perforated member solidifies, whereby said plunger applies a compressive fluid force against said fluid so as to provide a dampening force. In an alternative embodiment, the unique electrode configuration of the present invention are utilized in a shock absorber having a by-pass conduit.

An alternative embodiment utilizes the conventional design of original shock absorbers and employs the shock absorber oil as the working fluid; the conventional flap valves, or other valves, are replaced by electrified self contained electro-rheological control valves, each containing the unique electrode configuration of the present invention, to control the oil flow through valves in the conventional dampening plunger and/or a similar valve located between the working chamber and a reserve/expansion chamber.

30 Claims, 9 Drawing Sheets

ELECTRO-RHEOLOGICAL SHOCK ABSORBER

RELATED APPLICATIONS

This application is a continuation-in-part of co-pending U.S. application Ser. No. 376,748, filed Jul. 3, 1989, now abandoned, which was a continuation-in-part of U.S. application Ser. No. 339,748, filed Apr. 18, 1989, now both abandoned.

FIELD OF THE INVENTION

The present invention is directed to devices incorporating electroviscous and electro-rheological fluids for use in gasoline and diesel powered vehicles. Specifically, the present invention is directed toward electro-rheological shock absorber for use in automobiles, trucks and the like.

BACKGROUND OF THE INVENTION

Conventional shock absorbers have been utilized for decades to control the suspension, vibration, and smoothness of operation of automobiles, trucks, and similar motor vehicles. Conventional shock absorbers typically operate with the use of telescoping cylinders which utilize hydraulic or pneumatic pressure to control the extension and tension of the shock absorber so as to dampen and control the movement and oscillation of the struts, the large springs used to suspend the chassis. In operation, a piston associated with a first cylinder moves into and out of an oil-filled casing in response to the movements and vibrations of the vehicle. The downward thrust of the piston forces oil through a passage and valve located at the opposite end of the cylinder and into an outer sleeve. When the strut is thrust downward, the movement is only slightly dampened, so as not to impair the spring action of the strut. Ordinarily a valve with a large orifice is used to permit the oil to escape from the cylinder quickly, thereby resulting in a small dampening effect. The extension of the spring is significantly dampened by contrast. Accordingly, a much narrower orifice is typically used for a second valve, which opens when the piston travels in the other direction, corresponding to the extension of the telescoping members. The shock absorber is therefore double-acting, with different levels of dampening occurring in each of the two directions.

The most popular type of shock absorber is the telescoping shock absorber. The telescoping shock absorber is attached to opposite ends of a strut and comprises two tubes, one fitting inside the other. The piston rod is connected to the outer tube and moves in an oil-filled inner chamber within the inner tube. The tube contains flap valves which alternately allow oil to pass in one direction and produce the dampening action.

When the telescoping pistons contract, the oil is forced through a flap valve into an outer chamber. When the piston moves back (corresponding to the decompression of the strut), the oil flows from the outer chamber through a second valve and back into the main chamber. There has heretofore been no reliable dynamic method for controlling the degree of dampening and tension between the cylinders.

It has been recognized for several decades that certain fluids respond to the influence of an electric potential by evidencing a rapid and pronounced increase in viscosity and an increased resistance to shear. Such electro-rheological or electroviscous fluids comprise slurries of finely divided hydrophilic solids in hydrophobic liquids. In the absence of an electric field, these fluids behave in a Newtonian fashion, but when an electric field is applied, the fluids become proportionately more viscous as the potential of the electric field increases. In strong electric fields, the fluids can thicken into a solid. The electro-rheological phenomenon reverses when the electric potential is removed, and the material returns to its fluid state. Electro-rheological fluids change their state very rapidly when electric fields are applied or released, with typical response times being on the order of one millisecond. The ability of electro-rheological fluids to respond rapidly to electrical signals makes them well suited as elements in mechanical devices. Patents directed to compositions of electro-rheological fluids include U.S. Pat. Nos. 3,367,872; 3,047,507 and 4,033,892. Electro-rheological fluids have been extensively used in clutches as disclosed, for example, in U.S. Pat. Nos. 4,444,298 and 4,493,615.

Recently, there have been preliminary efforts directed toward using electro-rheological fluids in shock absorbers or other dampening devices. These early efforts have been costly, and have produced systems requiring large quantities of expensive electro-rheological fluids and large electrified sleeves. Such early efforts at electro-rheological shock absorbers have also typically required the inclusion of long fixed electrode plates.

It would be desirable to have an electro-rheological shock absorber which can be utilized with conventional shock absorber designs currently in operation.

It would further be desirable to have an electro-rheological shock absorber which utilizes novel electrode configurations.

It would further be desirable to have an electro-rheological shock absorber which can replace the expensive and complex flap valving currently in use in conventional shock absorbers.

It would further be desirable to provide a novel shock absorber and dampening mechanism which can be easily utilized in a variety of vehicles.

In view of the above, it is an object of the present invention to provide a novel electro-rheological shock absorber which can replace conventional hydraulic shock absorbers.

It is a further object of the present invention to provide an electro-rheological shock absorber having a novel electrode configuration situated within the device itself which facilitates compactness, control, and which further facilitates compatibility with the on-board computers, microprocessors and state-of-the-art electronics found in today's automobiles and trucks.

Still another object of this invention is to provide the advantages of electro-rheological control with minimum quantity of the electro-rheological fluid.

Another object of this invention is to incorporate the electro-rheological control means in conventional shock absorbers without major manufacturing modifications.

An additional object of this invention is to provide an electro-rheological shock absorber which provides smoother operation at all speeds and driving conditions.

A still further object of the invention is to provide an electro-rheological shock absorber which is self-contained and which can easily be removed and replaced as a single unit.

SUMMARY OF THE INVENTION

The present invention in some of its embodiments departs from the conventional shock absorber by employing electro-rheological fluids instead of ordinary oil and by replacing the conventional valving found in the piston head and bottom valve with electrically controlled variable viscosity valves. Electrical signals are conducted by a multi-strand conductor to a perforated dampening member. A multi-strand conductor or wire can also be connected to one or more dampening valves positioned in the shock absorber. The valves may be separately activated so as to provide minimal resistance for soft spring action, moderate resistance for ordinary road travel and stiff resistance for high speeds and curves. Similarly, the lower valve can be electrified by a conductor extending through the bottom of the shock absorber.

In accordance with the present invention, an electro-rheological shock absorber is disclosed. The shock absorber comprises a generally cylindrical inner casing, said casing containing a chamber for holding an electro-rheological fluid; a generally cylindrical outer casing supporting an arm extending into said outer casing, said outer casing reciprocating within said inner casing; a dampening member coupled to said arm and extending into said electro-rheological fluid, said dampening member being perforated to permit the flow of electro-rheological fluid therethrough; and electrode means coupled to said dampening member for generating an electric field within said dampening member such that said electro-rheological fluid within said dampening member solidifies, whereby said plunger applies a compressive fluid dampening force.

In alternative embodiments, electro-rheological control valves are utilized to control dampening in conventional oil filled shock absorbers.

BRIEF DESCRIPTION OF THE FIGURES

The foregoing summary, as well as the following detailed description will be better understood when read in conjunction with the drawings appended hereto. For the purpose of illustrating the invention, there is shown in the drawings an embodiment which is presently preferred, it being understood, however, that the present invention is not limited to the precise arrangement and instrumentalities shown.

DETAILED DESCRIPTION OF THE INVENTION

Figure 1:
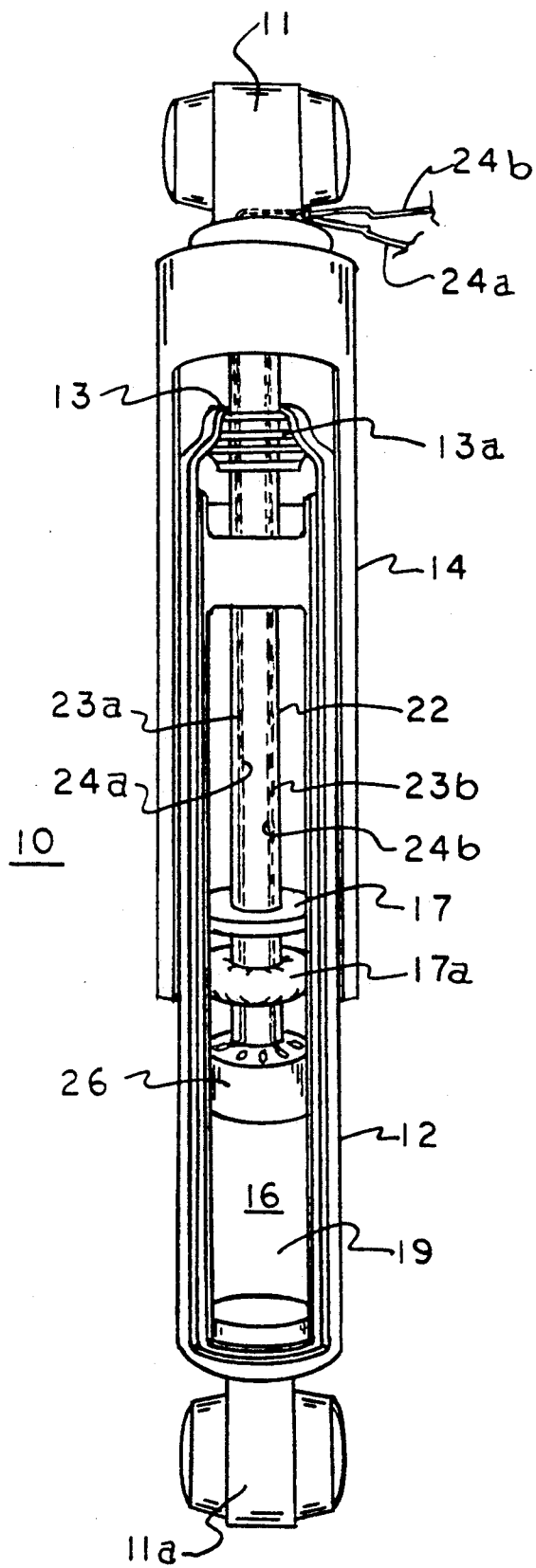
FIG. 1 is a section view of the shock absorber of the preferred embodiment.

The present invention is described with reference to the enclosed Figures wherein the same numbers are used where applicable. Referring to FIG. 1, the shock absorber 10 of the present invention is illustrated. The shock absorber 10 can be utilized to dampen and control vibration and shock in both automobiles and trucks. The shock absorber comprises inner 12 and outer 14 cylindrical housings or tubes. As will be readily recognized by those skilled in art, the shock absorber contains connection members 11, 11a for attachment to the hub and chassis of a vehicle (not shown). The housings 12, 14 mate to form a reciprocating telescoping unit. The inner housing 12 contains a sealed chamber 16 defined by the walls of the inner cylinder 12a, and a diaphragm 17 fixed to the inside walls of the housing 12. The invention further incorporates a floating ring shaped gas-filled tube, 17a, which surrounds arm 22 and which accommodates volumetric changes in chamber 16 which is filled with an electro-rheological fluid 19. Preferably, the tube 17a should be constructed from neoprene or rubber and filled with an inert gas, such as nitrogen. The tube expands or contracts with the volumetric changes in the chamber 16. The expansion tube need not reciprocate with the fluid motion, and may be located at any convenient location in the shock absorber.

As noted above, the sealed chamber 16 is filled with electro-rheological fluids 19. Electro-rheological fluids comprise slurries of finely divided hydrophilic solids in hydrophobic liquids. In the absence of an electric field, these fluids behave in a Newtonian fashion, but when an electric field is applied, the fluids become more viscous as the potential of the electric field increases. The phenomenon reverses when the electric potential is removed, and the material returns to its fluid state. In strong electric fields, the fluid thickens into a solid.

There are numerous electro-rheological fluids which have been developed. Preferably, the present invention should be utilized with electro-rheological fluids which are designed to operate in either high and low temperature environments such as those disclosed in U.S. Pat. Nos. 4,744,914 and 4,772,407, and which are incorporated herein by reference.

A hollow arm member 22 extends through the center of the outer cylindrical casing 14 and extends through inner casing 12 via orifice 13 and spring 13a. The hollow arm 22 contains an inner rod 23 defined by outer hashed lines 23a, 23b, which houses and supports two insulated conducting wires 24, 24a (inner hashed lines), which are coupled to an end of the shock absorber and which extend down the hollow arm 22. The connecting wires 24a, 24b extend downward and activate within the electro-rheological fluid contained within the sealed chamber 16. Attached to the hollow arm 22 is a perforated or flow-through dampening member 26. The dampening member 26 extends into the electro-rheological fluid contained within chamber 16. The perforated dampening member 26 can flow freely through the electro-rheological fluid contained within chamber 16. However, when an electrical impulse is applied to the dampening member, it serves to solidify or semi-solidify the electro-rheological fluid contained therein. This solidification or semi-solidification serves to impart a dampening force within the chamber 16.

The electrode configurations for the dampening member 26 of the present invention are now described with reference to FIGS. 3A-3D, 4, 5 and 6. While the present invention utilizes one of four preferred electrode configurations, in each of the embodiments, the perforated or flow-through dampening member 26 houses a sequence of electrodes which when activated by an electronic impulse, generate a plurality of electric fields which solidify the electro-rheological fluid contained within the perforations, and prevent the fluid from flowing through the solidified or semi-solidified member. The solidified or semi-solidified member 26 thereby serves as a dampening member which compresses against the remaining electro-rheological fluid contained in the chamber on the upstroke, thereby providing a variable dampening force when the strut expands.

As shown in FIGS. 3A-3D, the first flow-through member comprises a hollow cylindrical housing 30 having respective top and bottom plates 32, 34, each having a plurality of elongated radial apertures 36. The top and bottom plates 32, 34 each compress respective perforated insulative layers 38. The perforations of the insulative layers align with apertures 36 situated on the top and bottom plates. The housing 30 contains a spiral thermally resistant polymer, mylar or plastic band or coil 40 which is coated with a metallic electrode 42, 42a on each of its sides. The metallic coatings 42, 42a can consist of copper, aluminum, silver, nickel or any other electrically conductive material. The band turns are separated by plastic spacer ribs 44 which create both channels for fluid flow as well as maintain the electrical integrity of the coil. At the center of the spiral, one metallic band 42 is connected to a positive terminal 43 with the other being connected to a negative terminal 43a. As shown in FIG. 3B, the electric wiring extends through inner rod 23, and the spiral coil effectively forms a wound alternating sequence of positive and negative terminals. When the electrodes 43, 43a are activated, fluid flowing through the apertures 36 is solidified by the electric field formed between the walls of the spiral coil. The reciprocating flow through dampening member 26 thus becomes a solid or semi-solidified plunger which applies a dampening force against the electro-rheological fluid in the shock absorber on the upstroke. The movement of the dampening member pushes against the remaining fluid and thus imparts a dampening force.

Figure 4:
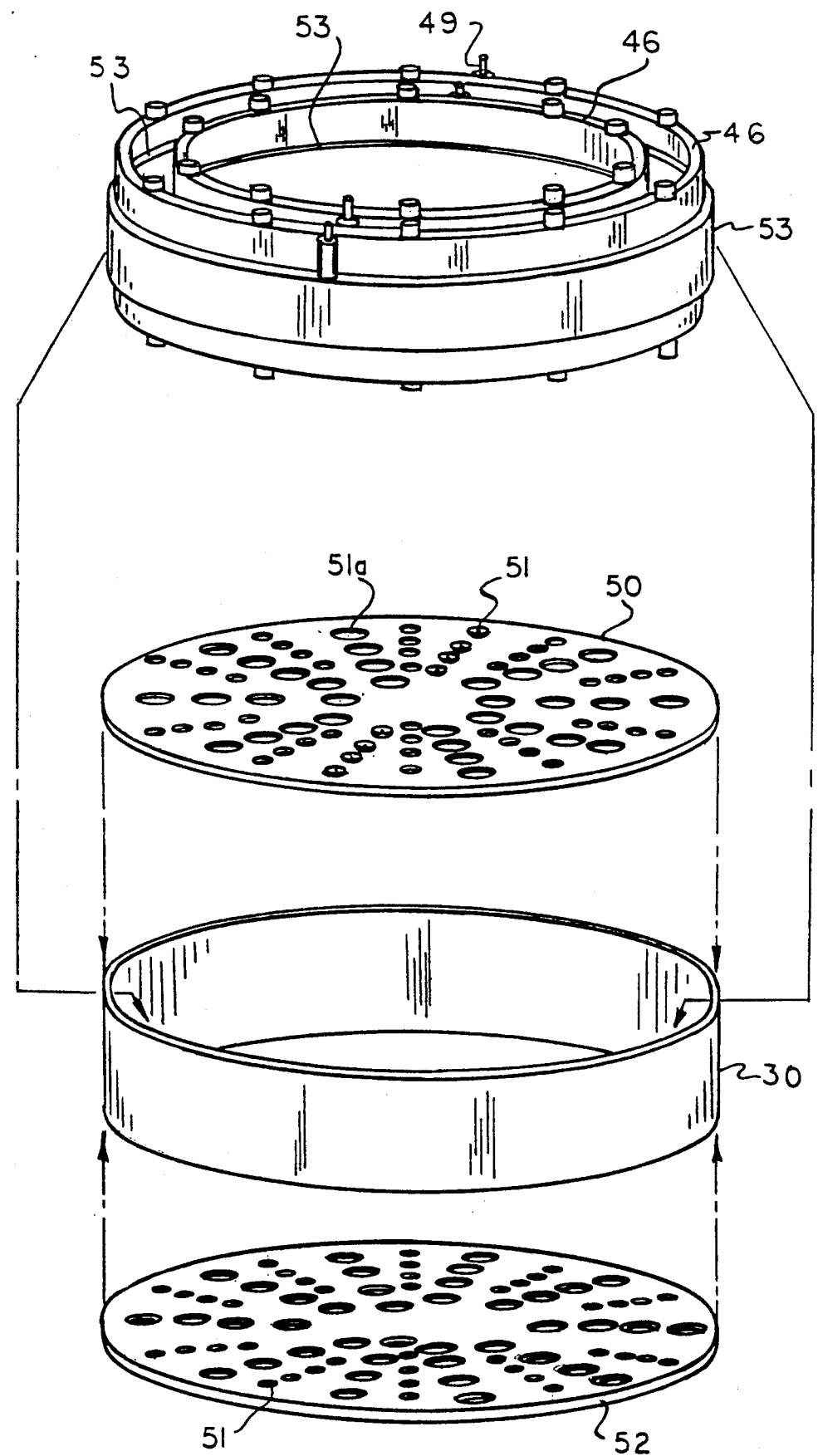
FIG. 4 is a configuration showing concentric rings or cylinders for electrodes utilized in the shock absorber of the preferred embodiment.

Referring to FIG. 4, the flow through dampening member comprises a sequence of concentric flat cylinders or bands 46. As with the first electrode configuration of FIGS. 3A-3D, the flat concentric cylinders or bands 46, which may be constructed of metal or from temperature resistant polymer, fit within a cylindrical housing 48 and contain respective top and bottom perforated plate members 50, 52. Each ring of metal is oppositely charged or each ring of plastic is coated on opposite sides with a ring band electrode 53 which is then connected via a positive or negative terminal 49 to holes 51 and through to rod 23 (not shown). In operation, electro-rheological fluid flows through holes 51a between the concentric electrode rings and into the upper portion of the housing. When the plunger member 26 is electrified, a plurality of electric fields are created between the oppositely charges electrodes on the concentric bands or cylinders thereby solidifying the electro-rheological fluid situated therebetween. As with the embodiment of FIGS. 3A-3D, upon the activation of an electrical impulse, the perforated plunger transforms into a solid or semi-solid piston which serves to dampen the fluid within the chamber.

Figure 6:
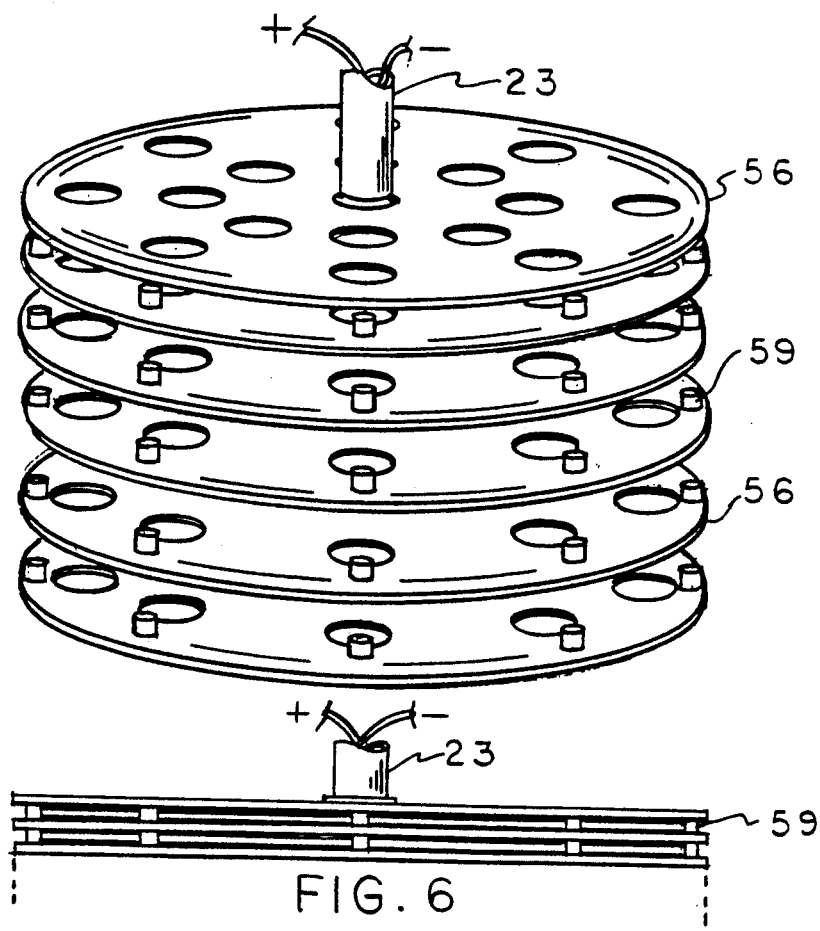
FIG. 6 illustrates an exploded view of the wafer electrode configuration to be utilized in the shock absorber of the preferred embodiment.

Referring to FIG. 6, the perforated dampening member 26 contains a multiple sequence of perforated metallic disk-shaped wafers 56 through which the electro-rheological fluid flows. The wafers form flow through screens, are configured alternatingly in a positive to negative relationship, and are retained in a non-contacting position by posts 59 or by separator ring washers. In this embodiment, the housing 30 (not shown) may itself serve as the negative terminal, with alternating wafers being maintained in electrical contact with the housing. The positive wafers are electrically insulated from the negative piston head and are in contact with a positive terminal which is insulated from the housing and which extends through rod 23. During operation, fluid flows through the parallel disposed disk shaped wafers. In some designs, it may be advantageous to off-set the orifices in the disk-shaped wafers 56, so as to increase the shear factor when the electro-rheological fluid is solidified. When the electrodes are activated, a multiplicity of electric fields are generated between the respective positive and negative terminals formed by the wafers. The electro-rheological fluid within each of the fields in dampening member 26 solidifies and the member forms a solid or semi-solidified plunger. The solidified plunger compresses the remaining electro-rheological fluid thereby imparting a dampening force.

Figure 5:
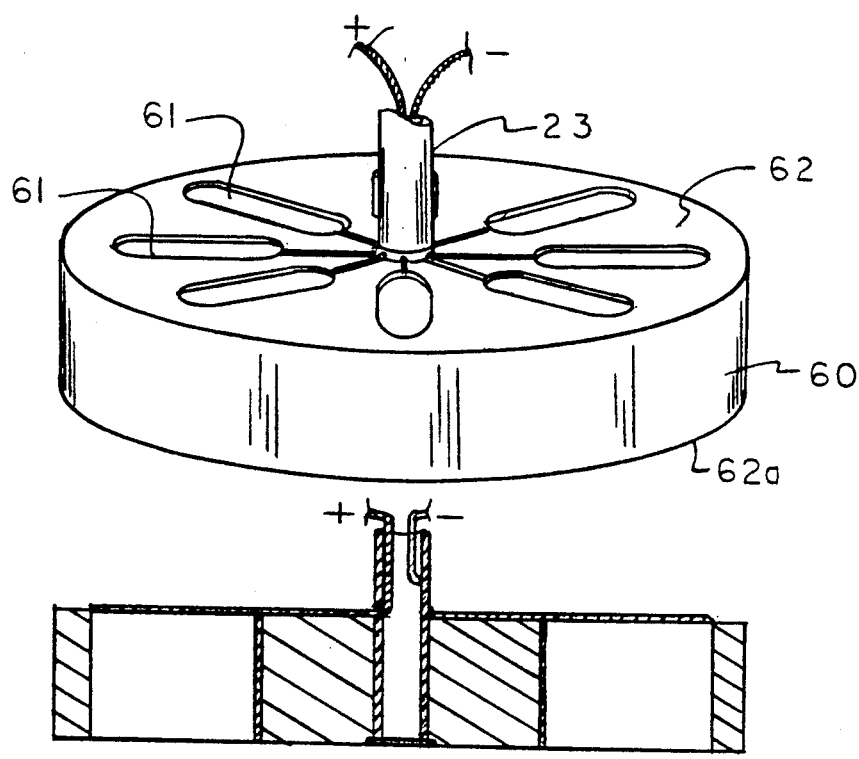
FIG. 5 illustrates a perforated or flow-through piston electrode configuration to be utilized in the shock absorber of the preferred embodiment.

A final embodiment of the perforated dampening member 26 is illustrated in FIG. 5. As with the previous embodiments, the piston head comprises a cylindrical casing having perforated top and bottom members 62, 62a. The casing contains a molded temperature resistant plastic disk 60. Disk 60 contains numerous radially extending apertures 61 through which electro-rheological fluid can flow and which are mated with the top and bottom member 62. The opposite sides of each radial aperture 63, 63a are coated or plated with copper or other conductive metal and function as respective positive and negative electrodes. The electrodes are parallel and separated at a uniform distance The width of each aperture should be between 0.5 and 1.5 millimeters. As shown, electrodes enter through rod 23 and electrify the opposite sides of each aperture. Electro-rheological fluid flows through the rectangular apertures until electrified. When the electrodes are activated, the electro-rheological fluid contained within each aperture solidifies, and the flow through member 26 forms a solid semi-solid dampening plunger.

Figure 2:
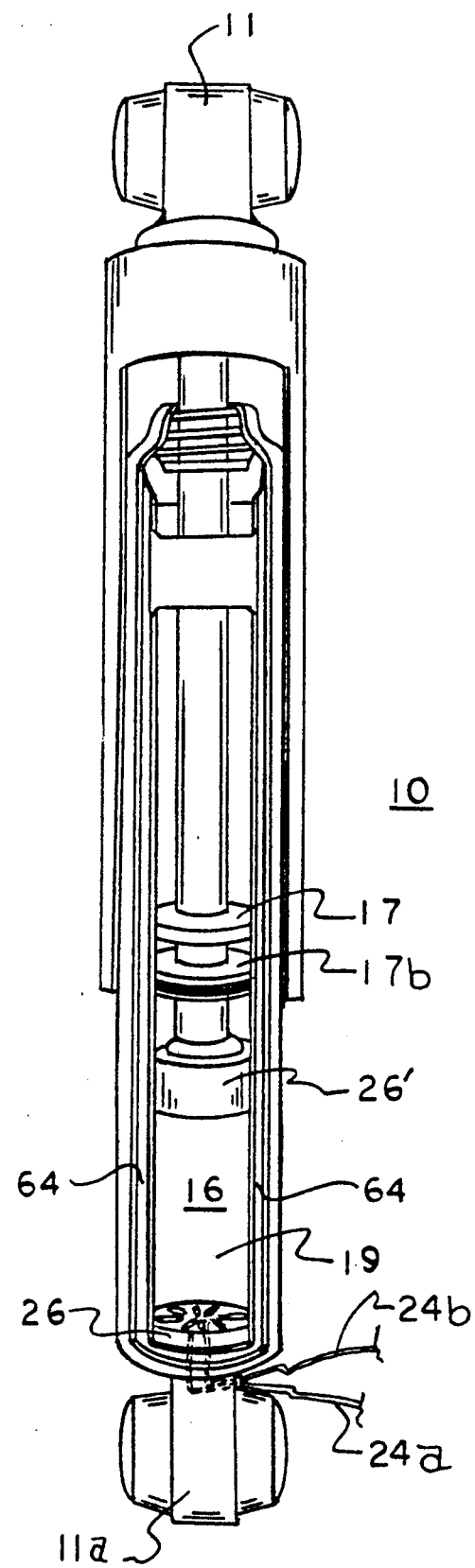
FIG. 2 is a section view of the shock absorber of the second embodiment which utilizes the perforated member as an electro-rheological flap valve.
Figure 3:
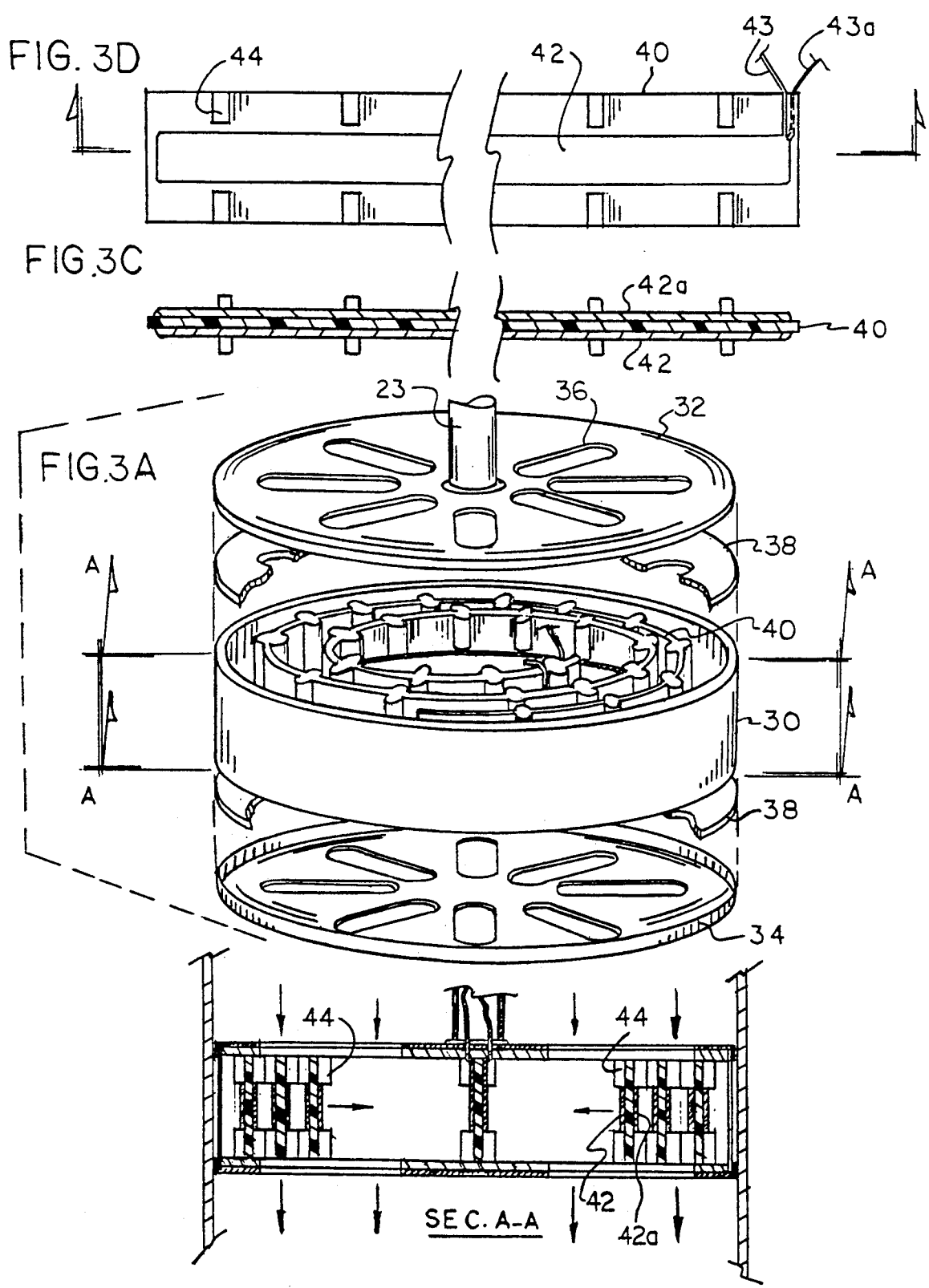
FIG. 3A illustrates an exploded view of the spiral ring electrode configuration utilized in the shock absorber of the preferred embodiment.
FIG. 3B is a section view of the spiral ring electrode configuration utilized in the preferred embodiment.
FIG. 3C is a planar view of the spiral electrode along line A—A of FIG. 3A.
FIG. 3D is a section view of the spiral electrode configuration utilized in the preferred embodiment.

As shown in FIG. 2, the flow through member 26 can also be utilized as an electro-rheological control valve in combination with an external chamber situated proximate to the bottom of the inner chamber 16 and a solid plunger 26′. Typically, the external chamber will comprise a hollow sleeve 64 surrounding chamber 16 When the telescoping units are compressed, the perforated valve member 26 would be minimally electrified. The perforated member would utilize one of the electrode configurations shown in FIGS. 3A-6. This would enable the electro-rheological fluid to exit the chamber into external chamber 64. When the telescoping unit expands, the electro-rheological fluid would be prevented or impeded from re-entering the internal chamber 16 by increasing the intensity of electrification of the valve member. The electro-rheological valve would activate via conductive wires 24, 24a. This will result in a suction force and a resultant dampening force on the strut.

Figure 11:
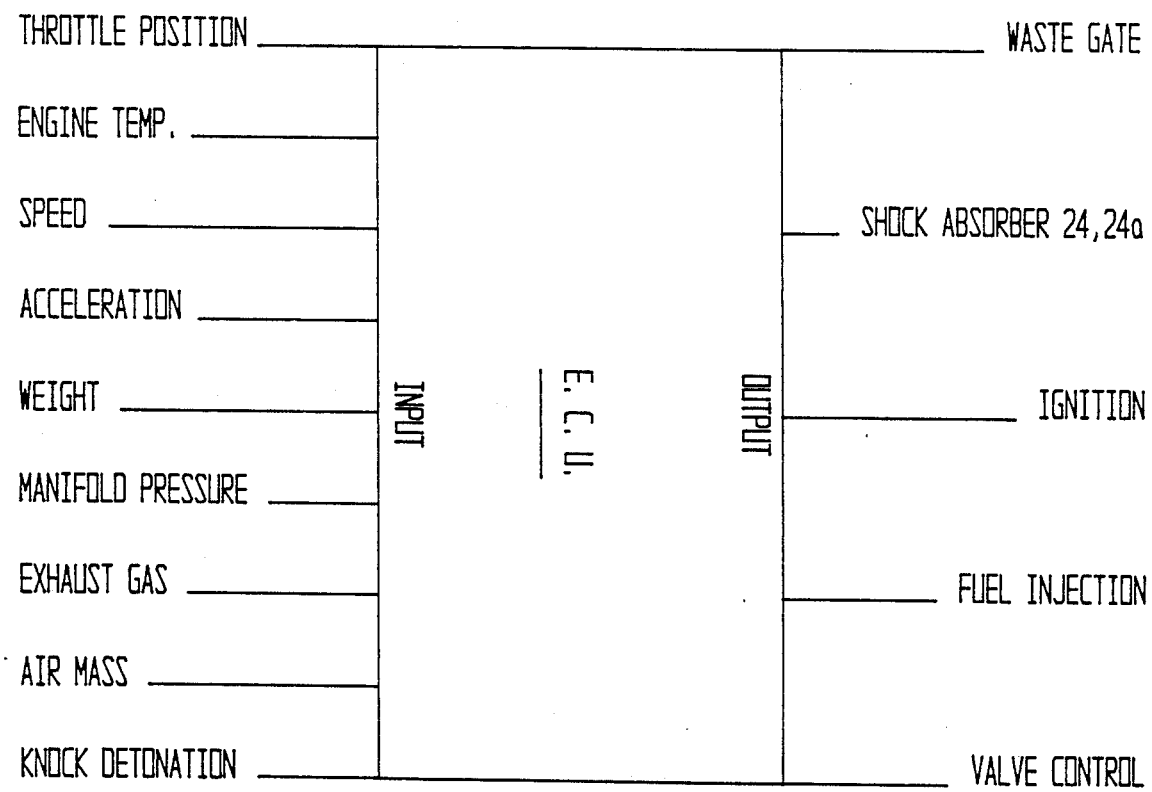
FIG. 11 is a block representation of the computer control system for the present invention.

The electro-rheological shock absorber of the present invention is controlled by an on-board control unit. The control unit 65 for the preferred embodiment is now described with reference to FIG. 11. The control unit of the preferred embodiment comprises a conventional microprocessor or computer which provides timing signals to control the electrification of the electro-rheological fluid contained within the shock absorber. Based upon such operating parameters as speed 65a, acceleration 65b, and the compression of the struts, the dampening characteristics of the shock absorber can be precisely controlled. The shock absorber is adjusted by varying the timing, intensity and duration of the activation signals. The perforated member instantaneously (within one millisecond) solidifies or becomes flow restrictive, and the electro-rheological fluid effectively transforms the member into a solid or semi-solid plunger which prevents or impedes further flow of fluid through the perforations. By adjusting the timing and duration of the electrode activation, the dampening effect of the shock absorber can be precisely controlled. It is to be noted that the control unit will typically provide different levels of dampening depending upon whether the strut is in compression or expansion. The member 26 is only slightly dampened during strut compression, but significantly dampened during expansion.

While the control mechanism has been described in the context of an on-board computer or microprocessor, it is to be appreciated by those skilled in the art that other mechanisms can be utilized to control the activation of the electrodes. These alternative devices include readily available piezoelectric accelerometers, and mercury switches sensitive to sudden shifts, accelerations and decelerations of the vehicle. Such devices will sense sudden braking, acceleration or sudden turns causing dipping, squatting or rolling and will direct current to the appropriate shock absorber to prevent excessive dips or lean.

Figure 7:
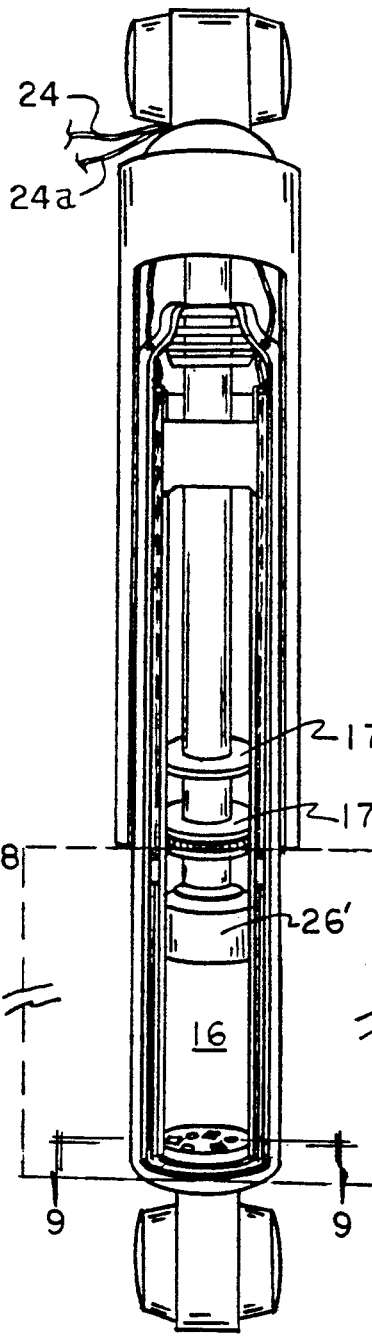
FIG. 7 is a section view of a third by-pass embodiment of the present invention.
Figure 9:
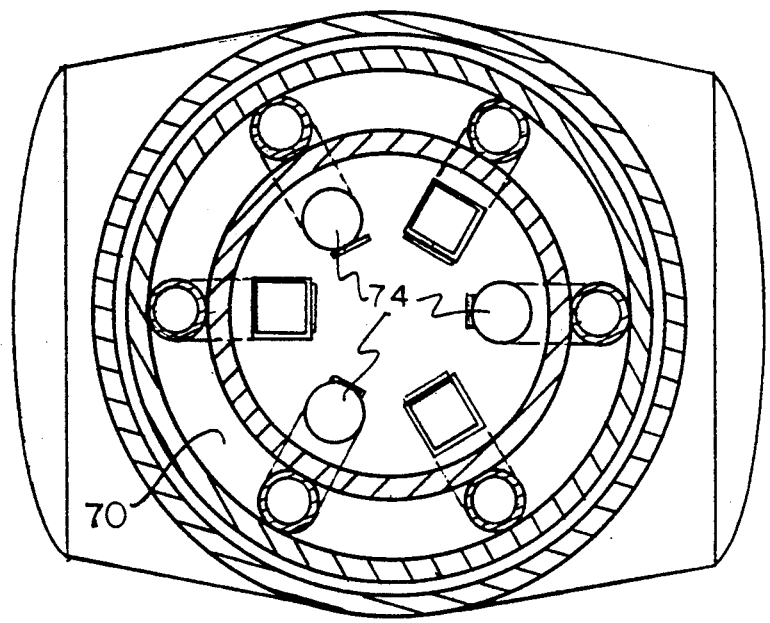
FIG. 9 is plan view of the outlet conduits of the embodiment of FIG. 7.
Figure 8:
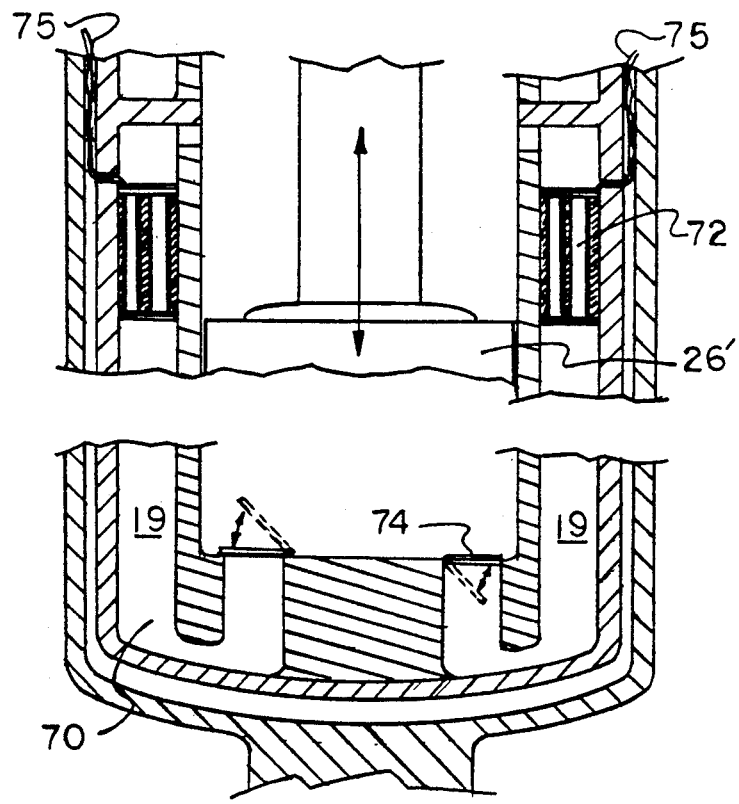
FIG. 8 is a broken away isolated view of the by-pass electrode configuration of the alternative embodiment.

A second alternative embodiment of the invention is illustrated in FIGS. 7, 8 and 9. This alternative configuration comprises the shock absorber of the preferred embodiment, and may include, in combination, the electro-rheological valve of FIG. 2 (not shown). Instead of the perforated dampening member 26 of FIGS. 3A-3D, 4, 5 and 6, the alternative embodiment incorporates a solid plunger 26′ with a series of by-pass conduits 70 which extend out the bottom of chamber 16. As shown in the plan view of FIG. 9, the by-pass conduits connect to ports 74. The by-pass conduits 70 contain perforated members 72, each of which incorporate one of the electrode configurations shown in FIGS. 3A-3D, 4, 5 and 6. In this embodiment, when the first member is pushed downward into the cylindrical chamber, solid plunger 26′ exerts a downward force against the electro-rheological fluid contained in the housing 16. The electro-rheological fluid enters the by-pass conduits 70 through ports 74 and flows through a perforated member 72 situated in each chamber. Upon the application of an electrical impulse to the perforated members via electrodes 75, the fluid within each member 72 solidifies or semi-solidifies. The conductive wiring extends down separate conduits as shown in FIG. 7. The electrification of the perforated members 72 block off the flow of electro-rheological fluid back into chamber 16 during expansion of the cylinders. The upward return thrust of the solid plunger 26′ against the remaining electro-rheological fluid contained within the chamber 16 provides a dampening suction force.

As noted above, provision should be made for the thermal expansion and the volumetric change within chamber 16 caused by the movement of arm rod 22 into the electro-rheological contained therein. As disclosed above, the preferred embodiment utilizes a nitrogen or neoprene filled ring which expands or contracts with thermal and volumetric changes in the chamber 16. Alternatively, as shown in FIG. 2, a floating ring-shaped diaphragm 17b is provided within the sealed chamber to account for the volumetric changes resulting from the depression of the arm 22 on the downstroke into chamber 16.

Figure 10:
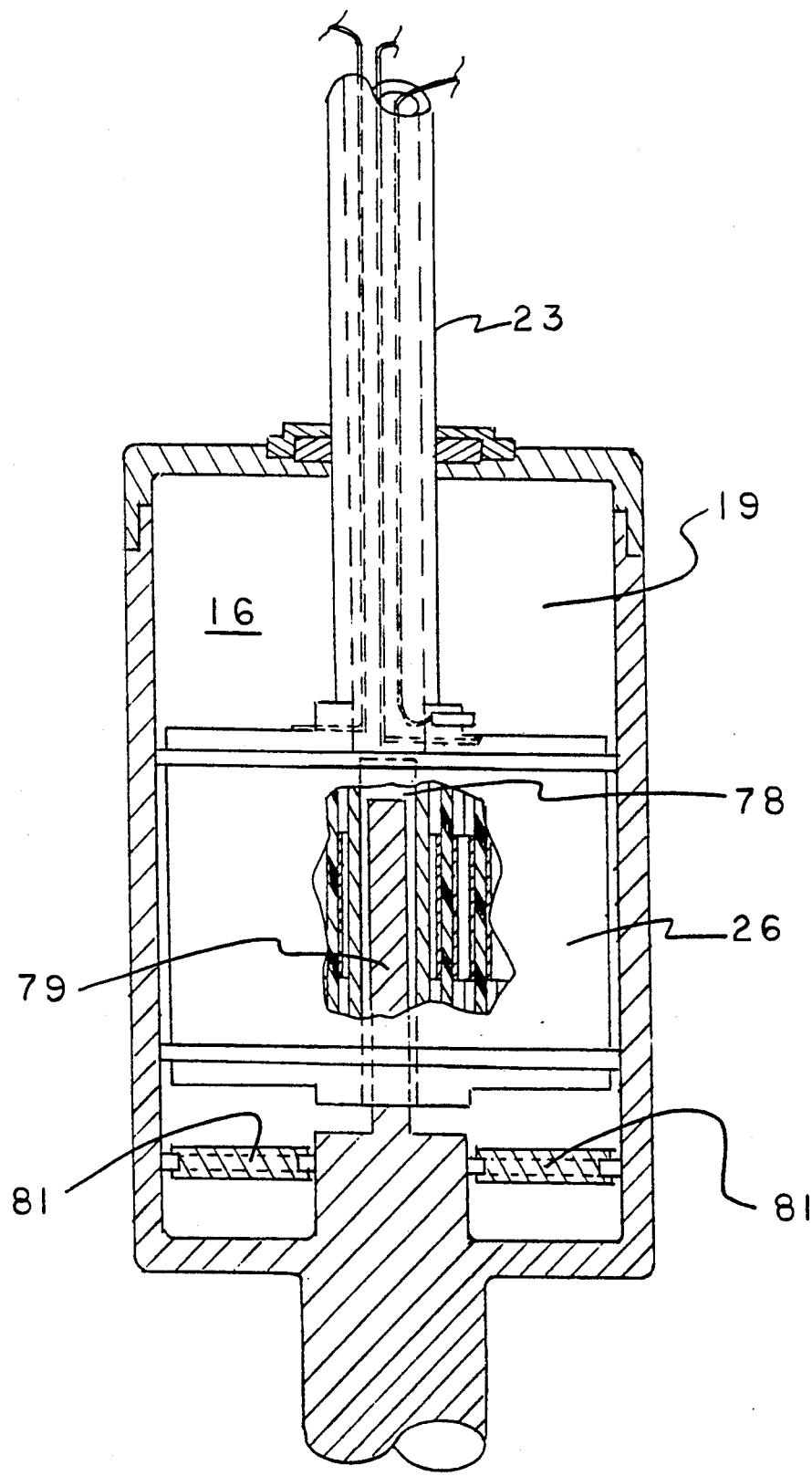
FIG. 10 is an alternative chamber arrangement for the preferred embodiment.

FIG. 10 illustrates an alternative arrangement for the sealed chamber 16 and perforated member 26. As shown, the perforated member 26 is thrust downward by a rod 23 into a sealed chamber 16 filled with electro-rheological fluid 19. The rod contains electric wiring which electrifies electrodes housed within the rod 23. The perforated member contains one of the electrode configurations shown in FIGS. 3A-D, 4, 5, and 6. The perforated member contains a central cavity 78. A boss 79 extends upward into the cavity of the perforated member and blocks the downward thrust of the perforated member. The embodiment of FIG. 10 utilizes a floating piston or diaphragm 81.

The operation of the present invention is now described with reference to the enclosed Figures. As shown in FIGS. 1 and 2, the shock absorber of the present invention comprises a pair of telescoping cylinders 12 and 14. The outer cylinder 14 has an arm member 22 supporting a perforated dampening member 26. The arm and dampening member extend into a chamber 16 within the inner cylinder containing electro-rheological fluid. When the telescoping cylinders contract, corresponding to compression of the strut, the perforated dampening member 26 is minimally electrified by control circuit 65, thereby creating a minimal dampening effect. When the strut starts to expand, the on-board control circuit 65 increases the intensity of the electrical signal thereby creating a significant dampening effect on the upstroke. The present invention therefore provides a shock absorber which can provide a variable dampening force during both expansion and contraction.

Figure 12:
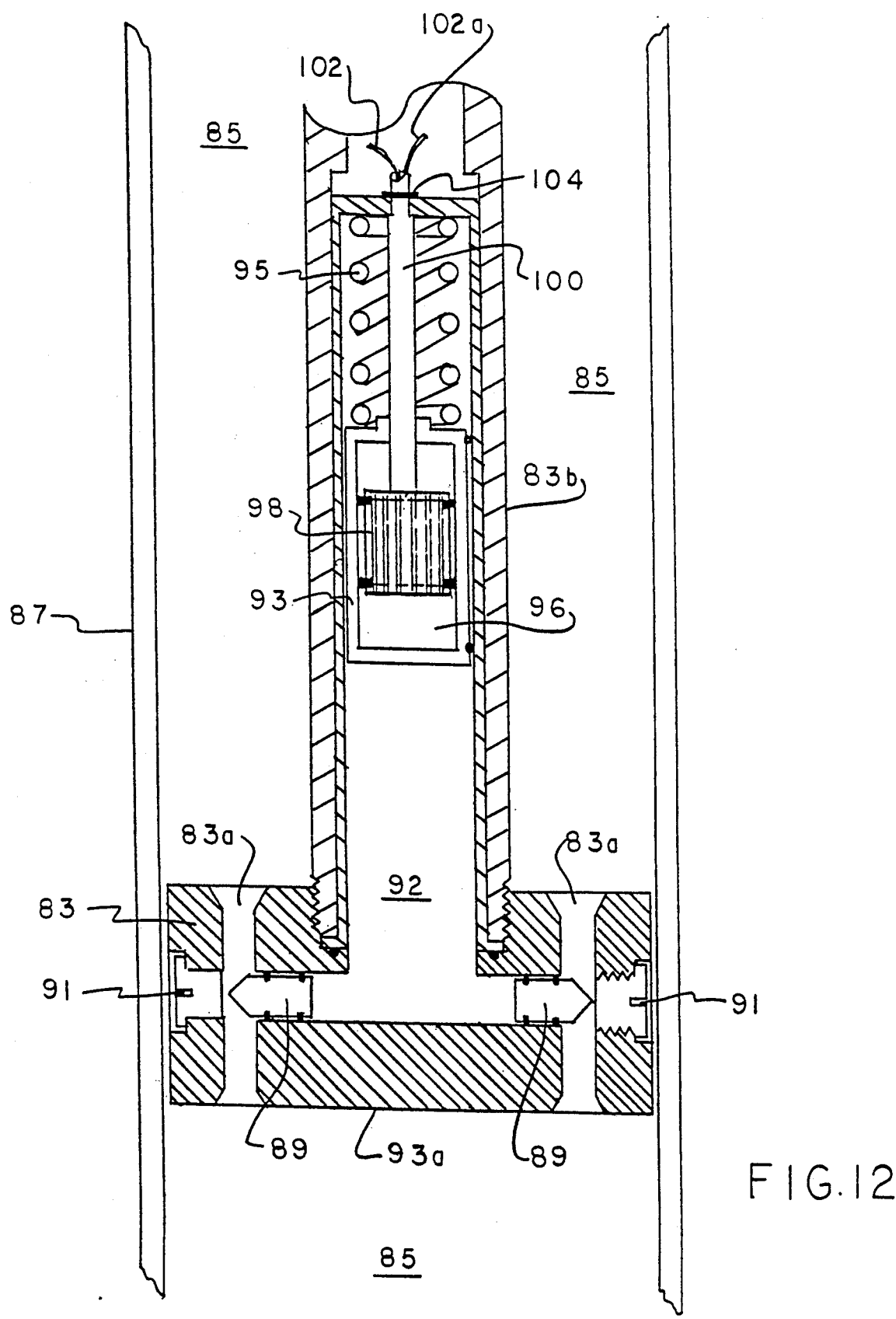
FIG. 12 is a section view of a conventional oil filled shock absorber in which a perforated piston member is dampened by electro-rheological valving.
Figure 13:
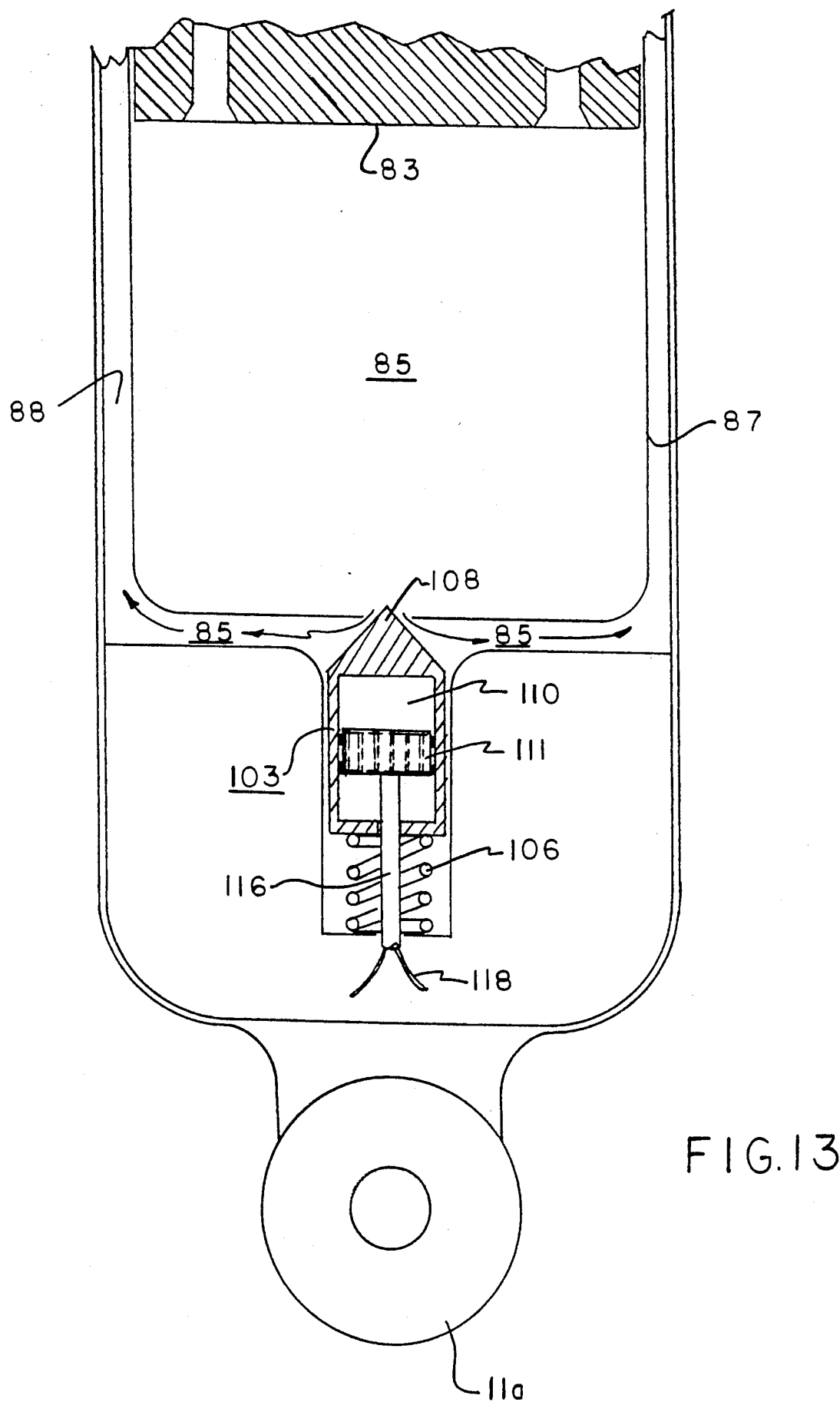
FIG. 13 is a section view of a conventional oil filled shock absorber which utilizes an electro-rheological valve to control the flow of oil between the main and by-pass chambers.

Two additional alternative embodiments of the present invention are illustrated in FIGS. 12 and 13. Each of these embodiments is designed to be utilized in a standard oil filled shock absorber. Both utilize electro-rheological valving to control the flow of oil in a standard shock absorber so as to vary the dampening force of the shock absorber. The embodiments disclosed in these Figures therefore permit the benefits of electro-rheological valving and control devices to be utilized in conventional oil filled shock-absorbers.

FIG. 12 illustrates an isolated section view of a standard oil filled shock absorber in which oil flow through a perforated piston is controlled by an electro-rheological dampening device contained within a perforated shock absorber piston. FIG. 12 illustrates a plunger member 83 extending in the oil 85 filled inner cylindrical casing 87 of a conventional shock absorber. The plunger member 83 is perforated 83a and the perforations are opened and closed by electro-rheologically controlled needle valves 89 which are inserted into and retracted from the perforations. The needle valves 89 are inserted into and retracted from seats 91. The respective insertion and retraction of the needle valves 89 are controlled by fluid or gas pressure 92. A control mechanism comprising an electro-rheologically controlled piston 93 which is situated in the central arm 83b of the plunger member 83. The piston 93 is hollow and is filled with electro-rheological fluid 96. A stationary electrode 98 having one of the configurations of FIGS. 3A–6 is located within the electro-rheological fluid 96. The electrode is held stationary by a rod 100 containing wires 102, 102a. Rod 100 extends up through the piston 93 and is held in place by a support 104 affixed to the arm. Piston 93 therefore moves longitudinally with respect to the electrode 98. The piston member 93 is biased downward by a biasing spring 95. A body of of fluid 92, such as oil or gas, fills the interior of the casing between the piston head 93a and the needle valves 89. In a stationary state, the biasing spring 95 must be strong enough to force the piston 93 downward so as to substantially close the needle valves 89, yet have the flexibility to permit the needle valves to thrust inward when the plunger 83 is thrust longitudinally in either direction.

In operation, when the plunger member 83 is thrust in a longitudinal direction (corresponding to automotive vibration), oil moves through the perforations 83a in the plunger 83. The needle valves 89 are accordingly thrust inward, and the electro-rheological piston 93 is thrust upward against the biasing spring. By varying the intensity of the signals to electrode 98, the upward reciprocation of piston member 93 is impeded thereby serving to dampen the inward movement of the needle valves. This accordingly varies the dampening effect of the plunger 83.

FIG. 13 illustrates an electro-rheological control needle valve 103 which is located between the passageway between the oil filled main shock absorber cylinder 87 and a reserve chamber or outer sleeve 88 which surrounds the working cylinder. The control valve is urged closed by a coiled spring 106. The control valve comprises a needle valve 108 which opens the passageway by the fluid pressure in the shock absorber working chamber 87; i.e. the fluid pressure works against the pointed nozzle tending to push it downward away from the nozzle orifice; the movement or action is opposed by the coiled spring.

The needle valve is hollow and is filled with electro-rheological fluid 110 The valve is biased upward by biasing spring 106 which, like the embodiment of FIG. 12, must be strong enough to force the needle valve substantially closed, yet have the flexibility to permit the needle valve to be thrust downward when plunger 83 is thrust downward. The valve houses a flow-through electrode 111 which has one of the electrode configurations discussed above in FIGS. 3A–6. The flow-through electrode 111 is held rigid in place by a hollow rod 116 which extends through the center of the valve. Electric wire 118 extends onto the rod. In operation, oil is forced into and out of outer sleeve 88 by the reciprocating motion of plunger 83. Needle valve 103 accordingly opens and closes, with respect to the stationary electrode. By varying the intensity of the electrical signal to electrode 111, the tendency of the of the needle valve to open can be increased or decreased. By increasing the tension force of the needle valve, less oil passes between the main chamber and reserve chamber thereby dampening the movement of the plunger 83.

The foregoing invention has been described with reference to the above disclosure. It is to be recognized by those skilled in the art that other embodiments fall within the spirit and scope of the invention and that the true scope of the invention is to be determined with reference to the claims appended hereto. Specifically, it will be recognized by those skilled in the art that alternative embodiments can utilize any combination of the several placement configurations shown and described herein.

What is claimed is:

1. An electro-rheological shock absorber comprising:
   a generally cylindrical inner casing, said casing containing a chamber for holding an electro-rheological fluid;
   a generally cylindrical outer casing supporting an arm extending into said outer casing, said outer casing reciprocating with said inner casing;
   a dampening member coupled to an end of said arm and extending into said fluid within said chamber, said dampening member containing a plurality of perforations to permit the flow of electro-rheological fluid therethrough;
   electro-rheological activating means integral with said dampening member communicating between at least one positive and one negative electrode means within said perforations for controlling the flow of fluid through each of said perforations;
   wherein said electrode means when charged applies a variable dampening force within said chamber.

2. The electro-rheological shock absorber of claim 1 further comprising an outlet chamber for holding fluid compressed by said dampening member from said fluid chamber and electro-rheological valve means for controlling the flow of fluid into and out of the said outlet chamber.

3. The electro-rheological shock absorber of claim 1 wherein said electro-rheological activating means comprises;
   a piston member reciprocating longitudinally within said hollow arm;
   a body of compression fluid located within said hollow arm said compression fluid being compressed by said piston member;
   retractable valve means in communication with said compression fluid for insertion into the perforations of said dampening member, said valve means closing off said perforations when said reciprocating piston member compresses said fluid against said valve means, said valve means retracting to open said perforations when said reciprocating piston member decompresses said compression fluid away from said valve means;

and electro-rheological control means for dampening the reciprocation of said piston member.

4. An electro-rheological shock absorber comprising:
a generally cylindrical inner casing, said casing containing a chamber for holding an electro-rheological fluid;

a generally cylindrical outer casing supporting an arm extending into said outer casing, said outer casing reciprocating with said inner casing;

a dampening member coupled to said arm and extending into said electro-rheological fluid within said chamber, said dampening member being perforated to permit the flow of electro-rheological fluid therethrough; and electrode means integral with said dampening member for generation an electric field within said perforations such that said electro-rheological fluid within said dampening member solidifies, whereby said dampening member applied a dampening force within said chamber.

5. The electro-rheological shock absorber of claim 4 wherein said activated means comprises a cylindrical disk having a plurality of apertures extending therethrough to permit the flow of electro-rheological fluid through said disk, each of said apertures containing a negative and positive electrode such that when said electrodes are activated, an electric field is generated in each aperture, thereby solidifying the electro-rheological fluid contained therein.

6. The electro-rheological shock absorber of claim 5 wherein the width of each said apertures is between 0.5 and 1.5 millimeters.

7. The electro-rheological shock absorber of claim 1 wherein said perforated dampening member comprises a spiral coil member contained within a perforated cylindrical casing, said spiral coil member containing positive and negative electrodes located on opposite sides of said spiral coil such that said spiral coil forms an alternating sequence of positive and negative terminals, whereby the application of an electrical impulse to said electrodes generates a plurality of electric fields within said spiral coil thereby solidifying the electro-rheological fluid located within said coil.

8. The electro-rheological shock absorber of claim 7 further comprising a plurality of rib members attached to said spiral for maintaining the electrical integrity of said spiral coil when it is placed within said perforated cylindrical casing.

9. The electro-rheological shock absorber of claim 4 wherein said perforated dampening member comprises a plurality of concentric bands, each of said bands having a positive electrode on a first side and a negative electrode on a second side, the positive electrode on a first band being in proximity to a negative electrode on a second band, such that upon the application of an electric signal to said electrodes, a plurality of electric fields are formed between said bands and the electro-rheological fluid between said bands solidifies.

10. The electro-rheological shock absorber of claim 9 wherein said concentric bands are retained within a hollow cylindrical casing having top and bottom members, said top and bottom members being perforated so as to permit the flow of electro-rheological fluid through said cylindrical casing.

11. The electro-rheological shock absorber of claim 4 wherein said dampening member comprises a hollow casing supporting a plurality of parallel disposed perforated disk-shaped metallic wafer members, said metallic wafer members forming a sequence of alternating positive and negative electrodes such that upon the application of an electrical impulse to said wafer members, a plurality of electric fields is formed between said alternating wafer members, thereby solidifying the electro-rheological fluid situated therebetween.

12. The shock absorber of claim 4 further comprising processor means for controlling the activation of said electrodes.

13. The electro-rheological shock absorber of claim 4 further comprising means for compensating for the thermal and volumetric changes of the electro-rheological fluid within said chamber.

14. The electro-rheological shock absorber of claim 13 wherein said compensating means is a flexible balloon filled with an inert gas.

15. The electro-rheological shock absorber of claim 14 wherein said compensating means is a ring-shaped nitrogen filled balloon which surrounds said arm within said chamber.

16. An electro-rheological shock absorber comprising:
an inner cylindrical casing containing a chamber holding an electro-rheological fluid;

an outer casing supporting an internal arm means extending colinearly with the walls of said casing;

a reciprocating dampening member connected to said arm means, said dampening member being disposed to thrust into said electro-rheological fluid within said chamber when said outer casing extends into said inner casing;

a by-pass conduit integral to said inner casing for the flow of electro-rheological fluid from said casing during the downward thrust of said piston;

a perforated dampening member situated within said by-pass conduit to permit the flow of electro-rheological fluid therethrough; and electrode means coupled to said perforated member for generating an electric field within said perforated member such that said electro-rheological fluid contained therein solidifies, thereby impeding the flow of electro-rheological fluid into said by-pass conduit and thereby creating a compressive dampening fluid force by said piston member.

17. The electro-rheological shock absorber of claim 16 wherein said perforated member comprises a cylindrical disk having a plurality of apertures extending therethrough for the flow of electro-rheological fluid, each of said apertures containing an oppositely disposed negative and positive electrode, such that when said electrodes are activated, an electric field is generated in each aperture, thereby solidifying the electro-rheological fluid contained therein.

18. The electro-rheological shock absorber of claim 16 wherein said perforated member comprises a spiral coil member contained within a cylindrical casing, said spiral coil member containing positive and negative electrodes on opposite sides of said spiral coil such that said coil forms an alternating sequence of positive and negative terminals, whereby upon the application of an electrical impulse to said electrodes, a plurality of electric fields are formed between the electrodes on said spiral coil and the electro-rheological fluid situated within said coil solidifies.

19. The electro-rheological shock absorber of claim 18 further comprising a plurality of rib members attached to said spiral coil for maintaining the electrical integrity of the spiral coil when it is housed within said casing.

20. The electro-rheological shock absorber of claim 16 in which said dampening member comprises a plurality of concentric bands, each of said bands having a positive electrode on a first side and a negative electrode on a second side, the positive electrode on a first band being in proximity to a negative electrode on a second band, such that upon the application of an electric signal to said electrodes, a plurality of electric fields are formed between said bands and the electro-rheological fluid situated between said bands solidifies.

21. The electro-rheological valve controller of claim 20 wherein said concentric rings are retained within a hollow cylindrical casing having top and bottom members, said top and bottom members being perforated so as to permit the flow of electro-rheological fluid through said cylindrical casing.

22. The electro-rheological valve controller of claim 16 in which said perforated member comprises a hollow casing supporting a plurality of parallel disposed perforated disk-shaped metallic wafer members, said metallic wafer members forming a sequence of alternating positive and negative electrodes such that upon the application of an electrical impulse to said wafer members, a plurality of electric fields is formed between said alternating wafer members, thereby solidifying the electro-rheological fluid within said hollow casing.

23. An electro-rheological shock absorber comprising:
a generally cylindrical inner casing, said casing containing a chamber for holding an electro-rheological fluid; a generally cylindrical outer casing supporting an arm extending into said outer casing, said outer casing reciprocating with said inner casing; a piston member coupled to said arm and extending into and compressing said electro-rheological fluid within said chamber;
an outlet chamber for holding electro-rheological fluid compressed from said chamber;
electro-rheological valve means for controlling the flow of electro-rheological fluid into and out of the said outlet chamber; and
electrode means integral with said valve means for generating an electric field between at least one positive and one negative electrode within said valve means such that said electro-rheological fluid within said valve means solidifies thus controlling the flow of electro-rheological fluid into and out of said outlet chamber, whereby said valve means applies a dampening force within said chamber.

24. An electro-rheological shock absorber comprising:
a generally cylindrical inner casing containing compression fluid;
a generally cylindrical outer casing supporting an arm extending into said outer casing, said outer casing reciprocating with said inner casing;
a dampening member coupled to an end of said arm and extending into said compression fluid within said chamber, said dampening member containing a plurality of perforations to permit the flow of fluid therethrough;
valve means for controlling the flow of the compression fluid, said valve means comprising: a valve member for insertion into the compression fluid, controlling the amount of compression fluid passing said valve member; and an electro-rheological actuating means in communication with the valve member and which controls the movement of the valve member;
said electro-rheological actuating means comprising: a moveable chamber, having an interior filled with electro-threological fluid and an exterior surface, the relative position of the exterior of the chamber controlling the relative position of the valve member; bias means providing tension against said chamber; piston means within the electro-rheological fluid having perforations therethrough permitting the flow of electro-rheological fluid through the piston; electrode means integral with the piston means for generating an electric field between at least one positive and one negative electrode such that said electro-rheological fluid within said piston solidifies thus controlling the movement of the piston within the chamber; whereby the relative position of the piston in the chamber controls the relative position of the exterior of the chamber;
wherein the amount of dampening of the shock absorber is controlled by adjusting the amount of compression fluid passing the valve member through control of the relative position of the electro-rheological actuating means.

25. The electro-rheological shock absorber of claim 24 wherein said valve member is oriented in the perforation in the dampening member, controlling the flow of compression fluid therethrough.

26. The electro-rheological shock absorber of claim 24 wherein
said shock absorber is provided with a reserve chamber in fluid communication with the inner casing through a port; and
said valve member is oriented in the port to control the flow of compression fluid therethrough.

27. The electro-rheological shock absorber of claim 24 wherein said valve actuating means is in communication with the valve member by direct contact with said valve member.

28. The electro-rheological shock absorber of claim 27 wherein said valve actuating means is integral with said valve member.

29. The electro-rheological shock absorber of claim 24 wherein said valve actuating means is in communication with the valve member by asserting pressure against a intervening body, which intervening body is in turn asserting pressure against the valve member.

30. The electro-rheological shock absorber of claim 29 wherein said intervening body comprises a fluid.

* * * * *

UNITED STATES PATENT AND TRADEMARK OFFICE
CERTIFICATE OF CORRECTION

PATENT NO. : 5,014,829

DATED : May 14, 1991

INVENTOR(S) : Nicholas S. Hare, Sr.

It is certified that error appears in the above-identified patent and that said Letters Patent is hereby corrected as shown below:

Col. 14, line 16: "electro-threological" should be --electro-rheological--

Signed and Sealed this

Fifteenth Day of September, 1992

Attest:

DOUGLAS B. COMER

Attesting Officer    Acting Commissioner of Patents and Trademarks